United States Patent
Su et al.

(10) Patent No.: US 11,425,191 B1
(45) Date of Patent: Aug. 23, 2022

(54) UNIFIED AND EFFICIENT METHOD TO GENERATE FILE SYSTEM TABLE (FSTAB) TO SUPPORT ON-PREMISE AND MULTI-CLOUD ENVIRONMENT

(71) Applicant: EMC IP Holding Company LLC, Hopkinton, MA (US)

(72) Inventors: Lihui Su, Shanghai (CN); Zak Yujun Liang, Shanghai (CN); Dan Tran, San Jose, CA (US); Yubing Zhang, Shanghai (CN); Amit Khanna, Pleasanton, CA (US); Olivia Wei, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/226,276

(22) Filed: Apr. 9, 2021

(51) Int. Cl.
*G06F 15/16* (2006.01)
*H04L 67/10* (2022.01)
*G06F 9/455* (2018.01)
*G06F 8/61* (2018.01)
*G06F 16/188* (2019.01)
*G06F 16/11* (2019.01)

(52) U.S. Cl.
CPC .............. *H04L 67/10* (2013.01); *G06F 8/61* (2013.01); *G06F 9/45558* (2013.01); *G06F 16/11* (2019.01); *G06F 16/188* (2019.01); *G06F 2009/45562* (2013.01); *G06F 2009/45595* (2013.01)

(58) Field of Classification Search
CPC ....... H04L 67/10; G06F 8/61; G06F 9/45558; G06F 16/11; G06F 16/188; G06F 2009/45562; G06F 2009/45595
See application file for complete search history.

(56) References Cited

U.S. PATENT DOCUMENTS

| 10,341,181 | B2* | 7/2019 | Bortnikov | ........... | H04L 41/0846 |
| 2017/0257263 | A1* | 9/2017 | Bortnikov | ........... | H04L 67/1097 |
| 2021/0049029 | A1* | 2/2021 | Kumble | .............. | G06F 9/45558 |

* cited by examiner

*Primary Examiner* — John B Walsh
(74) *Attorney, Agent, or Firm* — Womble Bond Dickinson (US) LLP (57) ABSTRACT

A method, apparatus, and system for generating a virtual machine (VM) installation file to deploy a VM in different cloud environments is disclosed. A file system table (FSTAB) representing a file system of the VM to be deployed is generated. The FSTAB includes one or more predetermined universally unique identifiers (UUIDs) identifying one or more dummy VM disks. Then, a first VM installation file based on the FSTAB and one or more dummy VM disk files corresponding to the dummy VM disks is generated. Next, one or more real VM disk files representing one or more real VM disks to be deployed in the cloud environments are created. Thereafter, the dummy disk files in the first VM installation file are replaced with the corresponding real VM disk files to generate a second VM installation file. The second VM installation is used to deploy VM in different cloud environments.

20 Claims, 12 Drawing Sheets

A PPDM fstab file

| /dev/sde1 | /agents | ext4 | defaults,nofail 0 0 |
| /dev/sdd1 | /vproxy | ext4 | defaults,nofail 0 0 |
| /dev/sdc1 | /vso | ext4 | defaults,nofail 0 0 |
| /dev/sdg1 | /search | ext4 | defaults,nofail 0 0 |
| /dev/sdf1 | /cdr | ext4 | defaults,nofail 0 0 |

FIG. 4

PPDM instance device/partition name in VMWare

```
lsblk
NAME   MAJ:MIN  RM  SIZE   RO TYPE MOUNTPOINT
sda      8:0    0   97.7G  0  disk
├─sda1   8:1    0   156M   0  part
├─sda2   8:2    0   204M   0  part /boot
├─sda3   8:3    0   29.3G  0  part /
├─sda4   8:4    0   8G     0  part [SWAP]
└─sda5   8:5    0   60G    0  part /logs
sdb      8:16   0   488.3G 0  disk
└─sdb1   8:17   0   488.3G 0  part /data01
sdc      8:32   0   10G    0  disk
└─sdc1   8:33   0   10G    0  part /vso
sdd      8:48   0   9.8G   0  disk
└─sdd1   8:49   0   9.8G   0  part /vproxy
sde      8:64   0   5G     0  disk
└─sde1   8:65   0   5G     0  part /agents
sdf      8:80   0   5G     0  disk
└─sdf1   8:81   0   4.9G   0  part /cdr
sdg      8:96   0   5G     0  disk
└─sdg1   8:97   0   4.9G   0  part /search
```

PPDM predefined fstab file

| | | | |
|---|---|---|---|
| /dev/sde1 | /agents | ext4 | defaults,nofail 0 0 |
| /dev/sdd1 | /vproxy | ext4 | defaults,nofail 0 0 |
| /dev/sdc1 | /vso    | ext4 | defaults,nofail 0 0 |
| /dev/sdg1 | /search | ext4 | defaults,nofail 0 0 |
| /dev/sdf1 | /cdr    | ext4 | defaults,nofail 0 0 |

PPDM instance device/partition name in AWS

```
lsblk
NAME        MAJ:MIN   RM   SIZE    RO TYPE MOUNTPOINT
nvme0n1     259:6      0   98G     0  disk
├─nvme0n1p1 259:8      0   156M    0  part /boot
├─nvme0n1p2 259:9      0   204M    0  part /boot
├─nvme0n1p3 259:10     0   29.3G   0  part /
├─nvme0n1p4 259:11     0   8G      0  part [SWAP]
└─nvme0n1p5 259:12     0   60G     0  part /logs
nvme1n1     259:0      0   10G     0  disk
└─nvme1n1p1 259:1      0   10G     0  part
nvme2n1     259:4      0   10G     0  disk
nvme3n1     259:3      0   5G      0  disk
└─nvme3n1p1 259:5      0   5G      0  part
nvme4n1     259:2      0   489G    0  disk
└─nvme4n1p1 259:13     0   488.3G  0  part /data01
```

FIG. 6A

PPDM instance device/partition name in VMWare

```
lsblk
NAME       MAJ:MIN  RM   SIZE    RO TYPE MOUNTPOINT
sda        8:0       0   97.7G   0  disk
├─sda1     8:1       0   156M    0  part
├─sda2     8:2       0   204M    0  part /boot
├─sda3     8:3       0   29.3G   0  part /
├─sda4     8:4       0   8G      0  part [SWAP]
└─sda5     8:5       0   60G     0  part /logs
sdb        8:16      0   488.3G  0  disk
└─sdb1     8:17      0   488.3G  0  part /data01
sdc        8:32      0   10G     0  disk
└─sdc1     8:33      0   10G     0  part /vso
sdd        8:48      0   10G     0  disk
└─sdd1     8:49      0   9.8G    0  part /vproxy
sde        8:64      0   5G      0  disk
└─sde1     8:65      0   4.9G    0  part /agents
sdf        8:80      0   5G      0  disk
└─sdf1     8:81      0   4.9G    0  part /cdr
sdg        8:96      0   5G      0  disk
└─sdg1     8:97      0   4.9G    0  part /search
```

FIG. 6B

PPDM instance device/partition name in Azure

```
fd0      2:0    1     4K  0 disk
sda      8:0    0   64G  0 disk
└─sda1   8:1    0   64G  0 part /mnt/resource
sdb      8:16   0   98G  0 disk
├─sdb1   8:17   0  156M  0 part
├─sdb2   8:18   0  204M  0 part /boot
├─sdb3   8:19   0 29.3G  0 part /
├─sdb4   8:20   0    8G  0 part
└─sdb5   8:21   0   60G  0 part /logs
sdc      8:32   0 488.3G 0 disk
└─sdc1   8:33   0 488.3G 0 part /data01
sdd      8:48   0    5G  0 disk
└─sdd1   8:49   0  4.9G  0 part /agents
sde      8:64   0    5G  0 disk
└─sde1   8:65   0  4.9G  0 part /cdr
sdf      8:80   0   10G  0 disk
└─sdf1   8:81   0   10G  0 part /vso
sdg      8:96   0    5G  0 disk
└─sdg1   8:97   0  4.9G  0 part /search
sdh      8:112  0   10G  0 disk
└─sdh1   8:113  0  9.8G  0 part /vproxy
```

FIG. 7A

PPDM instance device/partition name in VMWare 720

```
lsblk
NAME   MAJ:MIN RM  SIZE  RO TYPE MOUNTPOINT
sda     8:0    0  97.7G  0 disk
├─sda1  8:1    0   156M  0 part
├─sda2  8:2    0   204M  0 part /boot
├─sda3  8:3    0  29.3G  0 part /
├─sda4  8:4    0     8G  0 part [SWAP]
└─sda5  8:5    0    60G  0 part /logs
sdb     8:16   0 488.3G  0 disk
└─sdb1  8:17   0 488.3G  0 part /data01
sdc     8:32   0    10G  0 disk
└─sdc1  8:33   0    10G  0 part /vso
sdd     8:48   0    10G  0 disk
└─sdd1  8:49   0   9.8G  0 part /vproxy
sde     8:64   0     5G  0 disk
└─sde1  8:65   0   4.9G  0 part /agents
sdf     8:80   0     5G  0 disk
└─sdf1  8:81   0   4.9G  0 part /cdr
sdg     8:96   0     5G  0 disk
└─sdg1  8:97   0   4.9G  0 part /search
```

FIG. 7B

800 fstab using UUID

| | | | | |
|---|---|---|---|---|
| UUID=4660dcbe-637d-4835-becc-efab378e6bb0 | swap | swap | defaults | 0 0 |
| UUID=0e910b3f-e79d-4c79-8483-05cef8382d5c | / | ext4 | defaults | 1 1 |
| UUID=a84c75a9-cd51-47e4-9417-5697bde490d5 | /agents | ext4 | defaults | 1 2 |
| UUID=dd5b8089-c309-4dfa-8439-1814aa298721 | /boot | ext4 | acl,user_xattr,nosuid,noexec,nodev | 1 2 |
| UUID=565eae65-d946-4b89-b512-0f5d078f48a3 | /cdr | ext4 | defaults | 1 2 |
| UUID=01ebda6f-0219-4dbb-b085-64b47ea04b4f | /data01 | xfs | defaults | 1 2 |
| UUID=5c6aa4cd-2832-47a6-b254-931500f7422c | /logs | ext4 | noexec,nodev,nosuid | 1 2 |
| UUID=8be14c3a-9565-4e13-bf32-5bfb932508c2 | /search | ext4 | defaults | 1 2 |
| UUID=2089e77c-af56-4ec1-bf92-7e30d4da1cb2 | /proxy | ext4 | defaults | 1 2 |
| UUID=29a8b42c-4342-445f-88a6-4d33c96669ae | /vso | ext4 | defaults | 1 2 |

UNIFIED AND EFFICIENT METHOD TO GENERATE FILE SYSTEM TABLE (FSTAB) TO SUPPORT ON-PREMISE AND MULTI-CLOUD ENVIRONMENT

FIELD OF THE INVENTION

Embodiments of the present invention relate generally to virtual machines (VM). More particularly, embodiments of the invention relate to generating file system table (FSTAB) for different cloud environments.

BACKGROUND

Cloud computing is gaining popularity for its enterprise flexibility and scalability, enabling many businesses to access application software without the need for investing in computer software and hardware infrastructure. Although on-premise ("on-prem") applications utilizing an on-prem infrastructure may provide a more reliable and secure environment, the proliferation of cloud solutions has required more products to be deployed in on-prem environment and in cloud infrastructure via public cloud services such as Amazon Web Services® (AWS), Microsoft Azure® (Azure), Google Cloud Platform (GCP), etc.

Typically, Linux based product Virtual Machines (VMs) have multiple devices or partitions. The VMs can be application environments that can be installed on software, which imitate dedicated hardware. The end users may have the same experience on a VM as they would have on dedicated hardware. In Linux, a file system table FSTAB (e.g., /etc/fstab) is configured to look for specific file systems and mount them automatically in a desired way each and every time. The FSTAB is read by a mount command during boot time to determine the overall file system structure. When building a product Open Virtualization Appliance (OVA) image file, the FSTAB is generated based on a hard-coded device name and its corresponding folder to mount the device. In the VMWare environment, the sequence of Virtual Machine Disk (VMDK) file in the OVA image determines the device or the partition name. In this manner, the generated FSTAB for the OVA image file continues to function properly after the OVA is deployed.

In achieving various enterprise needs to deliver specific services, an enterprise may use a multicloud environment in which more than one cloud platform is used. In multicloud environments, a VMWare OVA image file is required to be converted to different cloud images depending on the public cloud services. Each public cloud service has different requirements on the device and the partition name. For example, in a VMWare environment, the device name is identified with a prefix "sd". On the other hand, in AWS, the device name is identified with a prefix "nvme". Moreover, in Azure environment, after PowerProtect Data Manager (PPDM) image is deployed, although the device name is identified with prefix "sd", the partition name may not be maintained in the same order as the VMWare environment. For example, the device name sdf1 has a corresponding partition name /vso in Azure. However, the device name with sdf1 has partition name /cdr in VMWare. As a result, after deploying and powering on the product instance, the FSTAB fails to mount the device or partition correctly. To overcome this, a script can be written to generate the FSTAB file for each cloud dynamically after the product instance is powered on and all volumes are attached. However, this requires an understanding of each cloud's device or partition naming convention and the corresponding volume before mounting them on a correct folder and generating the FSTAB. This attempt relies heavily on the cloud behavior and it is harder to control.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure relate to a method, apparatus, and system for generating a virtual machine (VM) installation file to deploy a VM in different cloud environments. The method generates a predetermined file system table (FSTAB) when building a product Open Virtualization Appliance (OVA) image file. When the product OVA image file is converted to a cloud image, the FSTAB continues to work on different cloud types.

According to some embodiments, an FSTAB representing a file system of the VM to be deployed is generated. The FSTAB includes one or more predetermined universally unique identifiers (UUIDs) identifying one or more dummy VM disks. Each of the one or more dummy VM disks serves as a placeholder for a real VM disk. A first VM installation file based on the FSTAB and one or more dummy VM disk files corresponding to the dummy VM disks are generated. One or more real VM disk files representing one or more real VM disks to be deployed in the cloud environments are created. Each of the real VM disk files is identified by the same UUID as of a corresponding dummy disk. The dummy disk files in the first VM installation file are replaced with the corresponding real VM disk files to generate a second VM installation file. The second VM installation is used to deploy VM in different cloud environments.

In one embodiment, the second VM installation file includes an identical file system configuration represented by the FSTAB. In one embodiment, the generating of a first VM installation file based on the FSTAB and one or more dummy VM disk files includes deploying a first VM with a target operating system (OS) and the one or more dummy VM disk files, creating a file system using the predetermined UUIDs of the dummy VM disks, mounting the one or more dummy VM disks in the file system, generating the FSTAB for the file system, and exporting the first VM into the first VM installation file.

In one embodiment, a root partition is created within the first VM. The root partition includes the FSTAB. In one embodiment, replacing the dummy disk files in the first VM installation file with the corresponding real VM disk files includes modifying a file size of each dummy VM disk file in the FSTAB to match a file size of a corresponding real VM disk file.

In one embodiment, the first VM installation file is a compressed file. The first installation file is decompressed to extract the dummy VM disk files and the FSTAB.

In one embodiment, the first VM installation file is compressed after replacing the dummy VM disk files to generate the second VM installation as a compressed file. In one embodiment, each of the first and second VM installation files is an OVA compatible image file. In this manner, a product OVA image is created with FSTAB having a predefined UUID to mount a device or a partition.

In another aspect of the disclosure, embodiments of the present disclosure also provide a non-transitory machine-readable medium and a data processing system perform the processes as described above.

Figure 1:
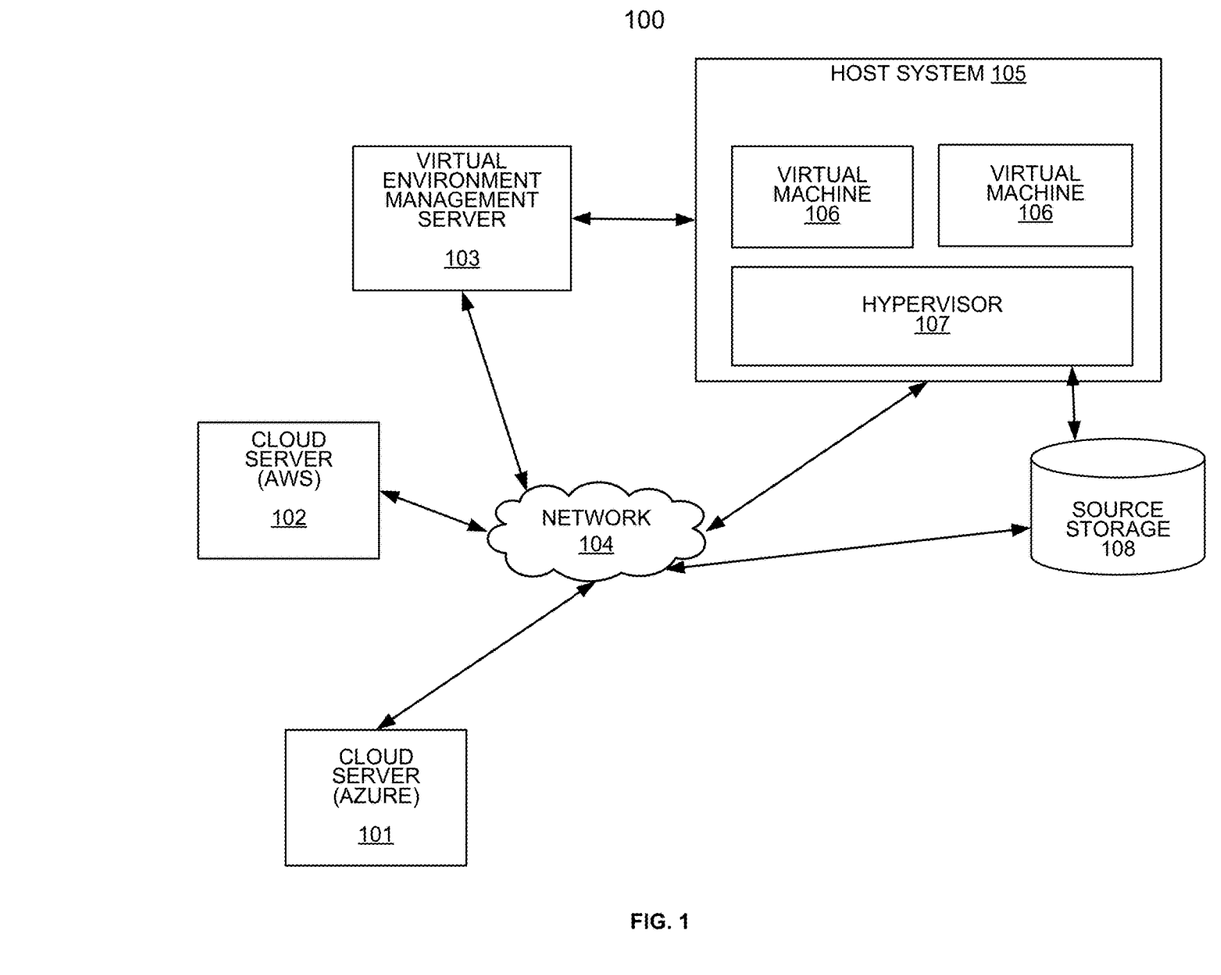
FIG. 1 is a block diagram illustrating an example environment in which embodiments of the disclosure may be practiced.

Referring to FIG. 1, a block diagram illustrating an example environment 100 in which embodiments of the disclosure may be practiced is shown. As depicted, the example environment 100 includes a host system 105, a virtual environment management server 103 source storage 108, cloud server (101 and 102), and a network 104.

As shown, a hardware host system 105 may host one or more virtual machines (VMs) 106 with the assistance of a hypervisor (e.g., VMware ESXi) 107. Each VM 106 may run a guest operating system (OS) that may be different from one another (e.g., Windows, Linux, etc.). The VMs 106 may provide various services to users. Each VM 106 may be associated with one or more virtual machine disk image files stored at the host system 105 or source storage 108, which represent disk drives inside the VM 106. The hypervisor 107 may be managed by a virtual environment management server (e.g., VMware vCenter) 103. The hypervisor 107 may emulate a client or a server's CPU, memory, hard disk, network and other hardware resources, enabling VMs to share the resources. The hypervisor can emulate multiple virtual hardware platforms that are isolated from each other, allowing virtual machines to run Windows Server operating systems and Linux on the same physical host. Further, each VM 106 may have access to a network 104.

The virtual environment management server 103 may include, but not be limited to a computing device, a cloud computing device, mainframe, personal computer, desktop computer, laptop computer, tablet computer, personal digital assistant and any other device with computation capability.

The source storage device 108 may include a cloud storage device, magnetic storage device, optical storage device and any other physical or virtual storage device with storage capability.

As shown, the hardware host system 105 is communicatively coupled to one or more cloud servers (e.g., cloud server 101 and cloud server 102). Although only two cloud servers, cloud server 101, and 102, are shown in FIG. 1, the environment 100 may include any number of cloud servers supported by the environment 100. It should be appreciated that the hypervisor 107, cloud server 101/102, virtual environment management server 103, and the source storage device 108 may have access to a network 104 (e.g., a public network), through which they may communicate with each other.

In one embodiment, the host system 105 further includes a storage manager or storage controller (not shown) configured to manage storage resources of storage system 108, such as, for example, storage space and processing resources (e.g., processor, memory, network resources). The storage manager or controller may be accessed by an administrator of virtual environment management server 103 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage service (e.g., file-based, block-based, object-based, or HDFS) to a client, based on a storage policy or service level agreement associated with that particular client as part of software-defined storage services.

Figure 2:
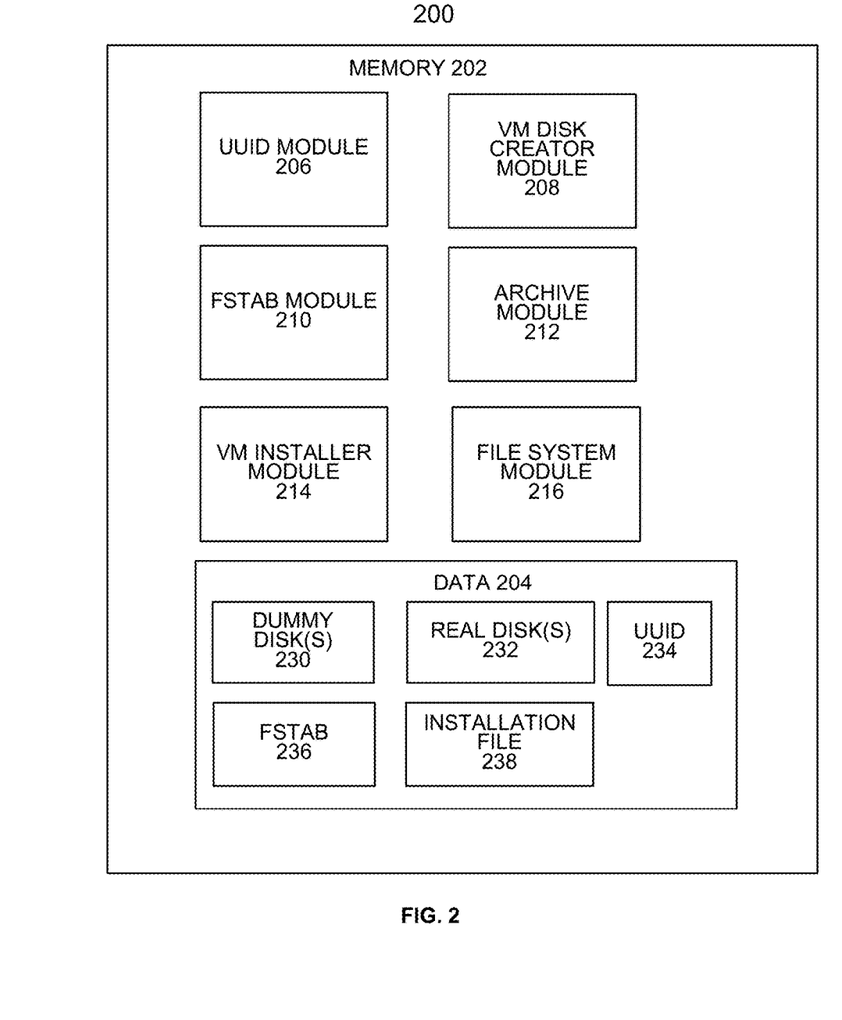
FIG. 2 is a block diagram illustrating a computing system that implements the generation of a virtual machine (VM) installation file to deploy a VM in different cloud environments according to one embodiment.

FIG. 2 shows a block diagram illustrating a computing system 200 that may be used to implement the generation of a VM installation file to deploy a VM in different cloud environments according to one embodiment. The computing system 200 may be part of virtual environment management server 103 in FIG. 1. As shown, the computing system 200 may include memory 202 and data 204. The memory 202 may include UUID module 206, VM disk creator module 208, FSTAB module 210, archive module 212, VM installer module 214, and file system module 216. Data 204 may include dummy disk 230, real disk 232, UUID 234, FSTAB 236, and installation file 238.

In one embodiment, UUID module 206 generates the UUID 234 identifying one or more dummy VM disks 230. Each of the one or more dummy VM disks 230 serves as a placeholder for a real VM disk 232.

In one embodiment, FSTAB module 210 generates a file system table (FSTAB) 236 representing a file system of the VM to be deployed. The FSTAB 236 includes one or more predetermined UUIDs.

In one embodiment, VM installer module 214 generates a first VM installation file based on the FSTAB 236 and one or more dummy VM disk files 230 corresponding to the dummy VM disks. The first VM installation file may be stored as installation file 238.

VM disk creator module 208 creates one or more real VM disk files 232 representing one or more real VM disks to be deployed in the cloud environments. Each of the real VM disk files 232 is identified by the same UUID as of a corresponding dummy disk.

VM installer module 214 replaces the dummy disk files in the first VM installation file with the corresponding real VM disk files 232 to generate a second VM installation file. The second VM installation is used to deploy VM in different cloud environments.

In one embodiment, the second VM installation file includes an identical file system configuration represented by the FSTAB.

In generating a first VM installation file based on the FSTAB and one or more dummy VM disk files, the computing system 200 may deploy a first VM with a target operating system (OS) and the one or more dummy VM disk files. File system module 216 creates a file system using the predetermined UUIDs of the dummy VM disks. The computing system 200 may mount the one or more dummy VM disks in the file system, generating the FSTAB for the file system. The mounting of the one or more dummy VM disks may be performed using a virtual disk mount application programming interface (API) (e.g., the VixMntapi library provided by VMware). The VM installer module 214 exports the first VM into the first VM installation file.

The computing system 200 creates a root partition within the first VM, wherein the root partition includes the FSTAB. In replacing the dummy disk files in the first VM installation file with the corresponding real VM disk files, the VM installer module 214 modifies a file size of each dummy VM disk file in the FSTAB to match a file size of a corresponding real VM disk file. The first VM installation file may be a compressed file. Archive module 212 decompresses the first installation file to extract the dummy VM disk files and the FSTAB.

Archive module 212 compresses the first VM installation file after replacing the dummy VM disk files to generate the second VM installation as a compressed file. Each of the first and second VM installation files is an OVA compatible image file.

Figure 3:
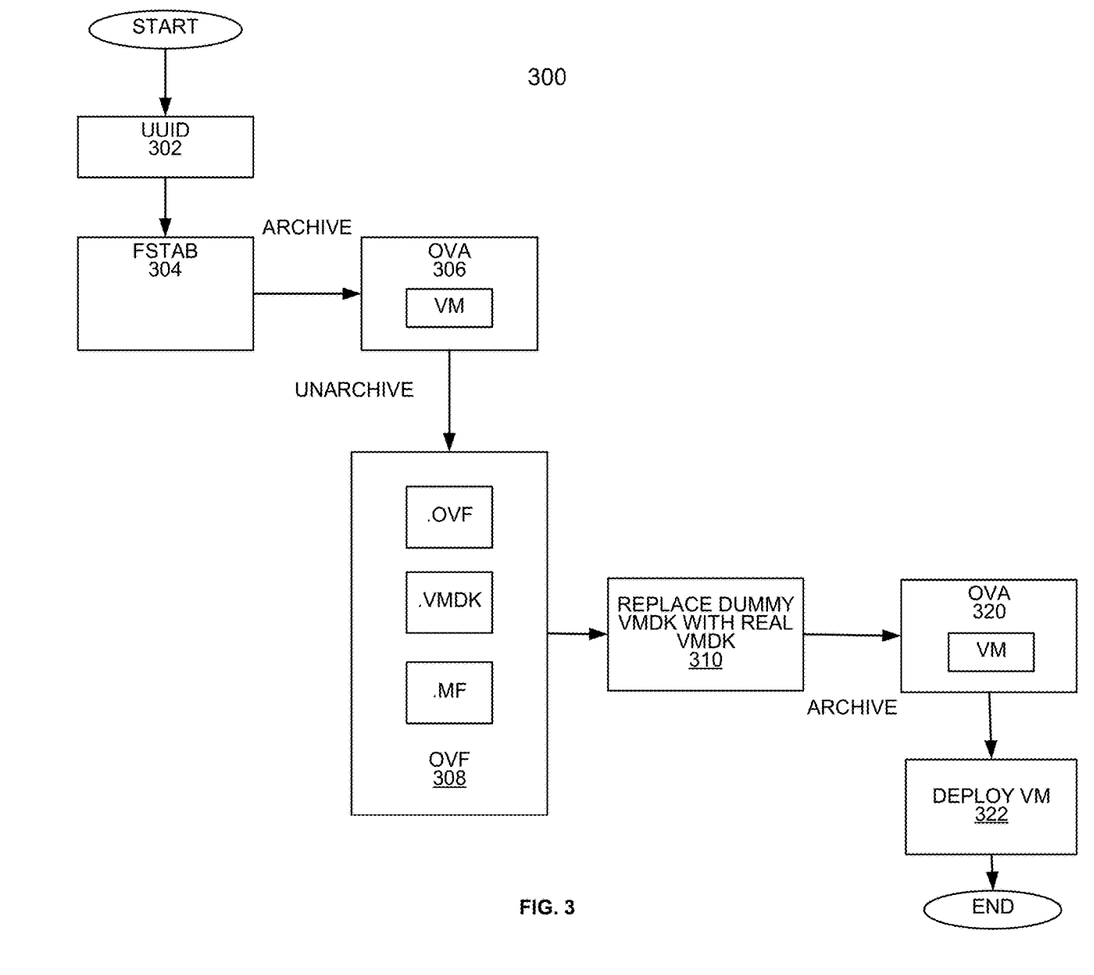
FIG. 3 is a block diagram illustrating a flow diagram depicting a virtual machine (VM) installation file generation process that according to one embodiment.

FIG. 3 is a flow diagram depicting a VM installation file generation process 300 according to one embodiment. Process 300 may be performed by processing logic that includes hardware (e.g. circuitry, dedicated logic, etc.), software (e.g., embodied on a non-transitory computer readable medium), or a combination thereof. For example, process 300 may be performed by computing system 200 of FIG. 2 or system 100 of FIG. 1. Referring to FIG. 3, at block 302, a predefined UUID identifying one or more dummy VM disks is generated. At block 304, a FSTAB representing a file system of the VM to be deployed is generated. The FSTAB includes one or more predetermined UUIDs identifying one or more dummy VM disks. Each of the one or more dummy VM disks serves as a placeholder for a real VM disk.

The VM may be shut down before the product VM can be exported into VMDK format. The virtual machine disk image file may be a VMDK file. The export process may be fast because the dummy partition size is small. For example, it may take 20 minutes to build the image when exporting of a dummy partition with 600 MB in size. The product VM can be exported into a VMDK format as a compressed or archived file such as ZIP, TAR, JAR, or other archive format, as readily known by one skilled in the art. The OVA image file includes an Open Virtualization Format (OVF) file with an extension .ovf, the real VMDK files, the dummy VMDK files, and a manifest file with an extension .mf.

As shown, at block 308, the OVA image file is extracted to unarchive the compressed or archived files. At block 310, the dummy disk file in the first VM installation file is replaced with the corresponding real VM disk files to generate a second VM installation file at block 320.

At block 322, VM is deployed in different cloud environments using the second VM installation. In this manner, the FSTAB may be pre-generated when building the product OVA image. When the product OVA image is converted to a cloud image, the FSTAB continues to work on different cloud types. The product OVA image is generated with FSTAB with a pre-defined UUID.

Figure 4:
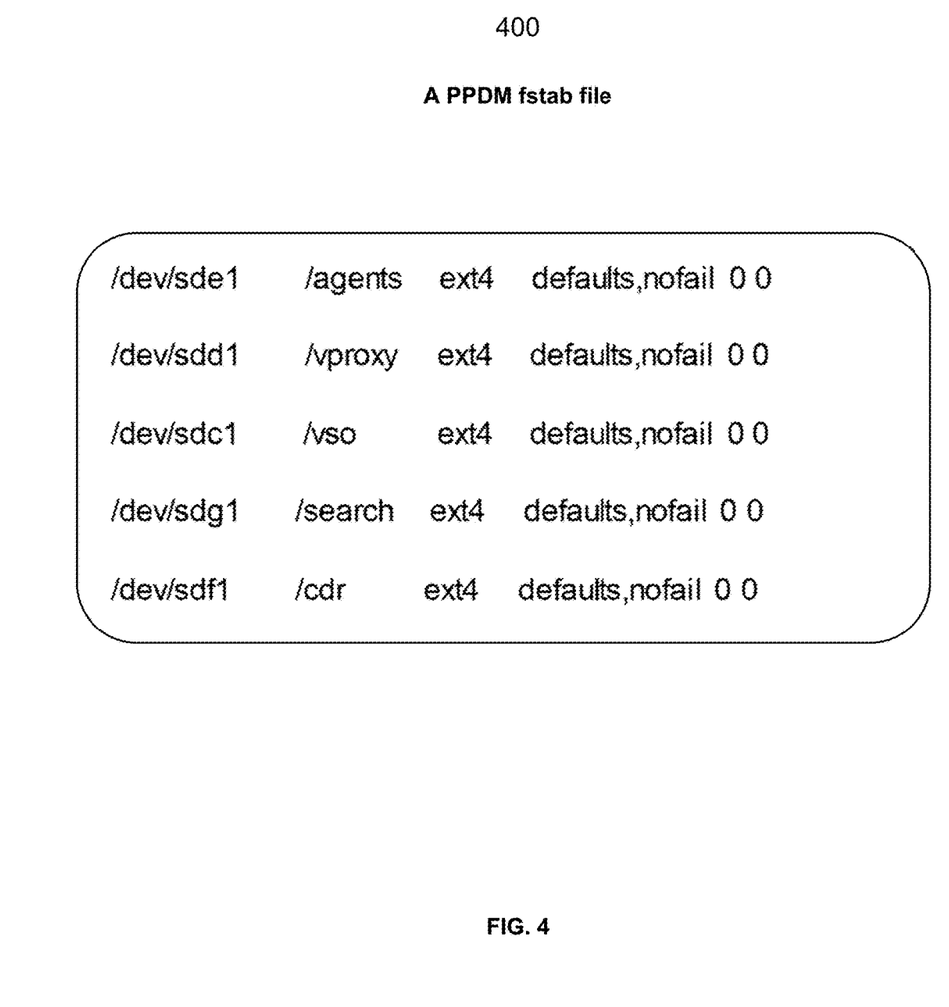
FIG. 4 is an illustration depicting an example of a PowerProtect Data Manager (PPDM) file system table (FSTAB) according to one embodiment.

FIG. 4 is an example of FSTAB file 400 of PPDM according to an embodiment. Each line in the FSTAB 400 describes a file system and includes fields used to provide information about its mount point, the options which should be used when mounting it, etc. For example, FSTAB 400 instructs the VM to mount partition /dev/sde1 to the folder /agents upon start up.

Figure 5A:
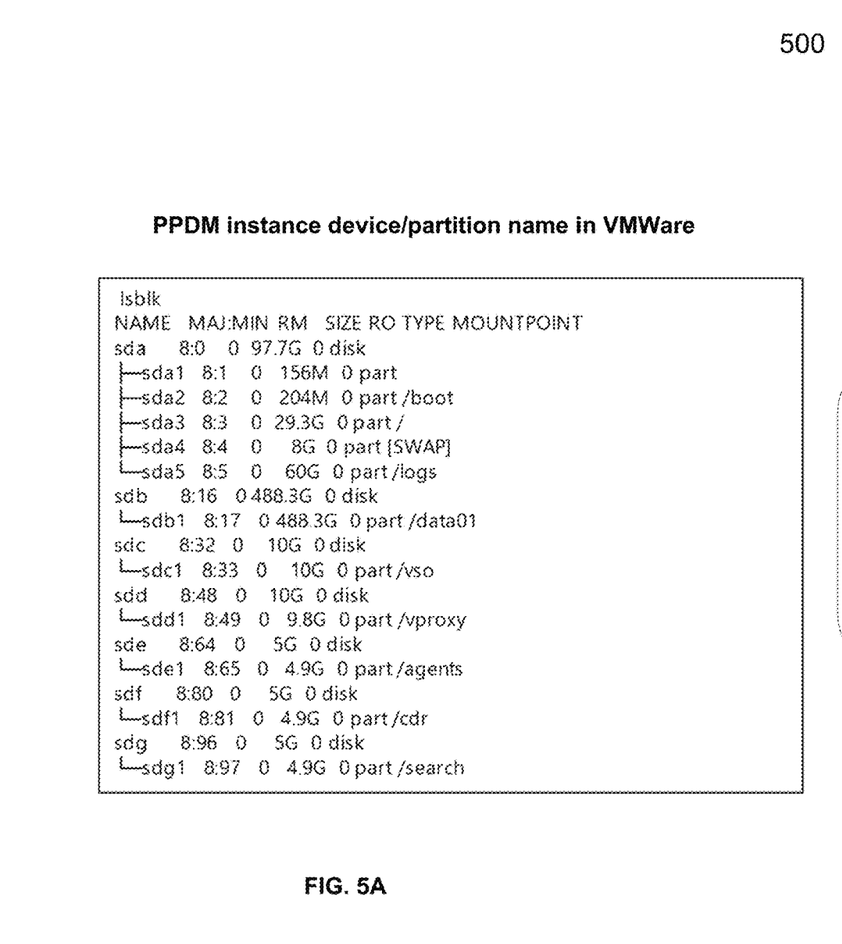
FIG. 5A is an illustration depicting an example of a PPDM instance device or partition name in VMWare according to one embodiment.
Figure 5B:
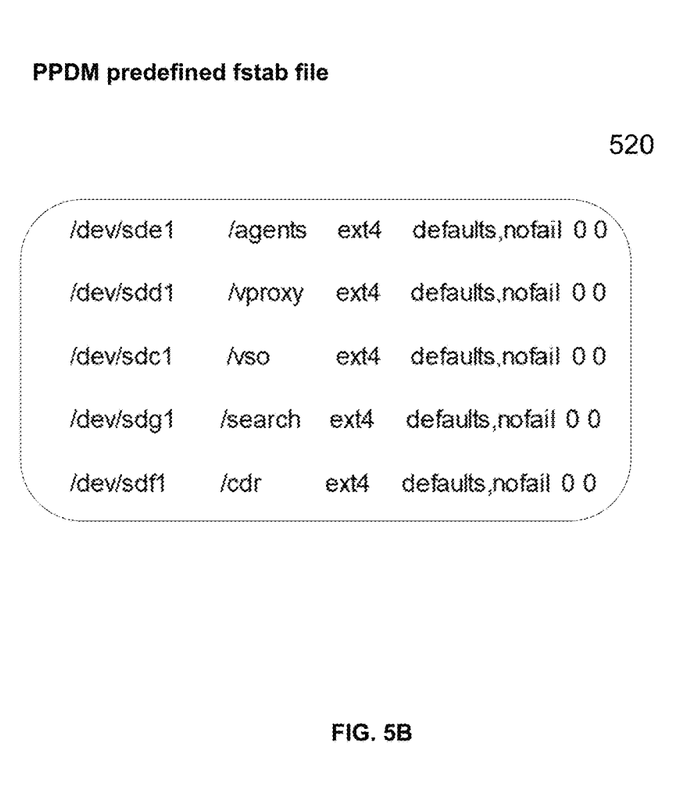
FIG. 5B is an illustration depicting an example of a PPDM FSTAB of a PPDM instance device or partition name in VMWare in FIG. 5A according to one embodiment.

FIG. 5 is an example of PPDM instance device or partition name in VMWare 500 according to an embodiment. In VMWare environment, the sequence of VMDK file in the OVA determines the device or partition name. In this manner, a predefined FSTAB 520 continues to work after the OVA is deployed.

Figure 6A:
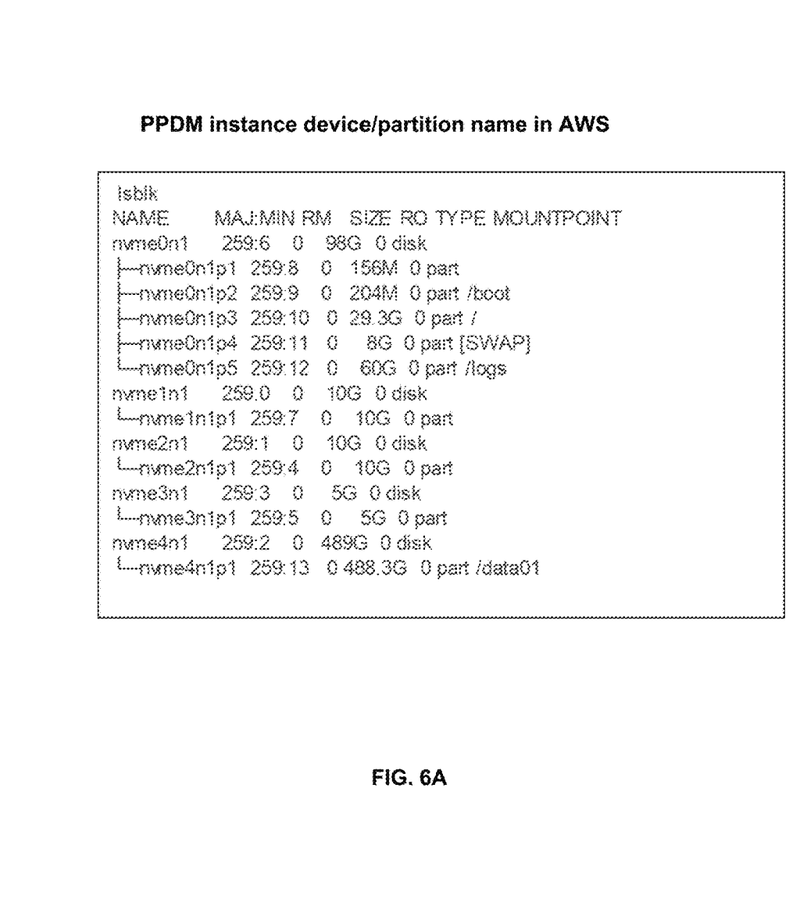
FIG. 6A is an illustration depicting an example of a PPDM instance device or partition name in AWS according to one embodiment.
Figure 6B:
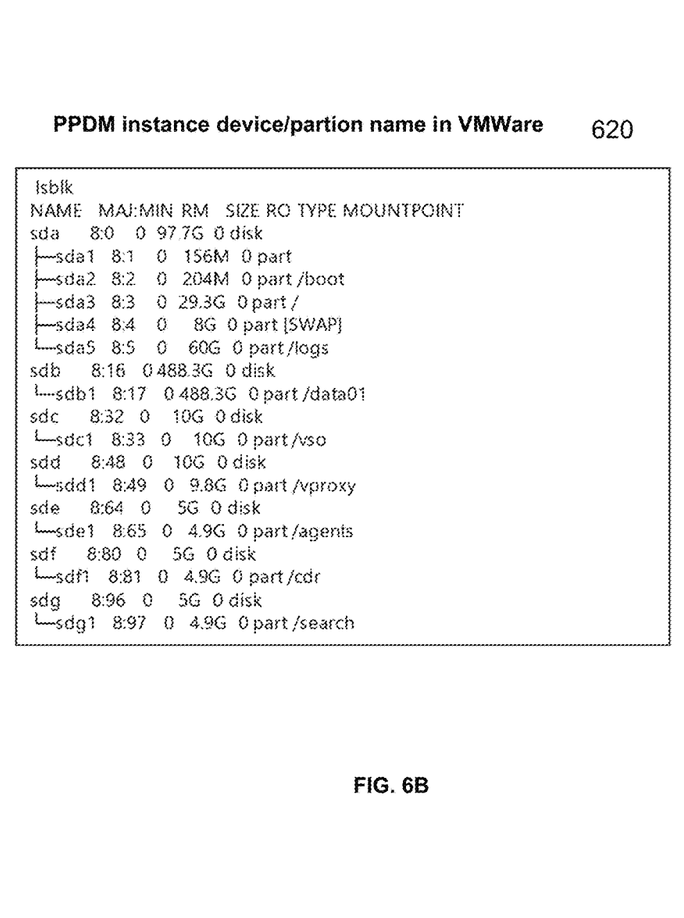
FIG. 6B is an illustration depicting an example of a PPDM instance device or partition name in VMWare according to one embodiment.

FIG. 6 is an example of PPDM instance device or partition name in AWS 600 according to an embodiment. When moved to a multi-cloud environment, a VMWare OVA image may be converted to a different cloud image. The device and partition name may be different based on a cloud type. For example, in VMWare environment 620, the device name has a prefix of "sd" (see FIG. 6B), however, in AWS the device name may have a prefix "nvme" (see FIG. 6A).

Figure 7A:
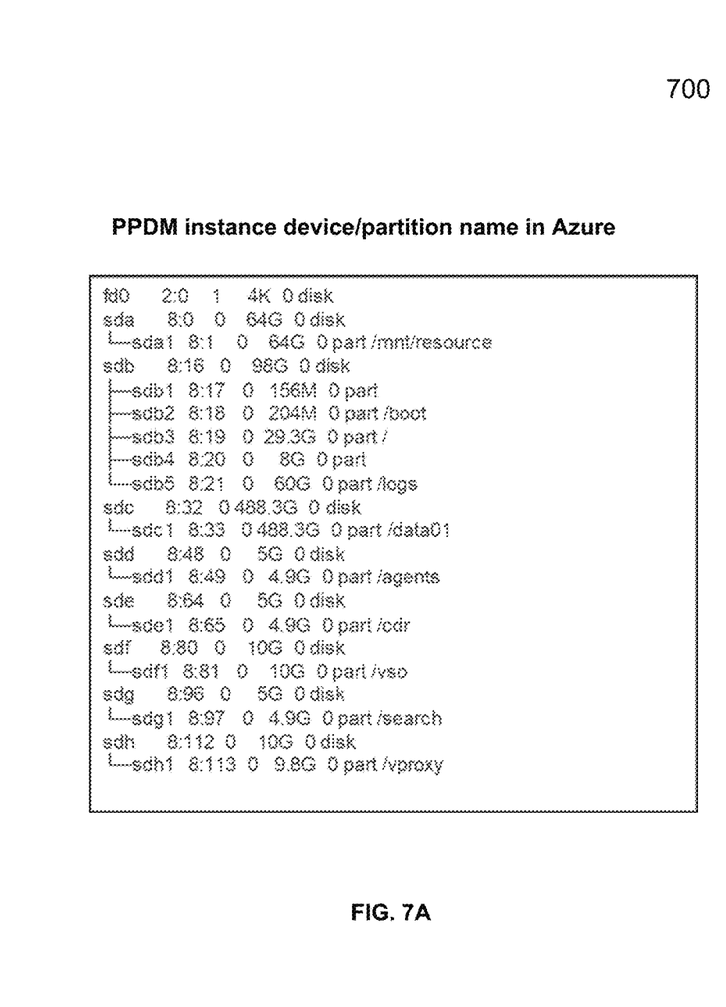
FIG. 7A is an illustration depicting an example of a PPDM instance device or partition name in Azure according to one embodiment.
Figure 7B:
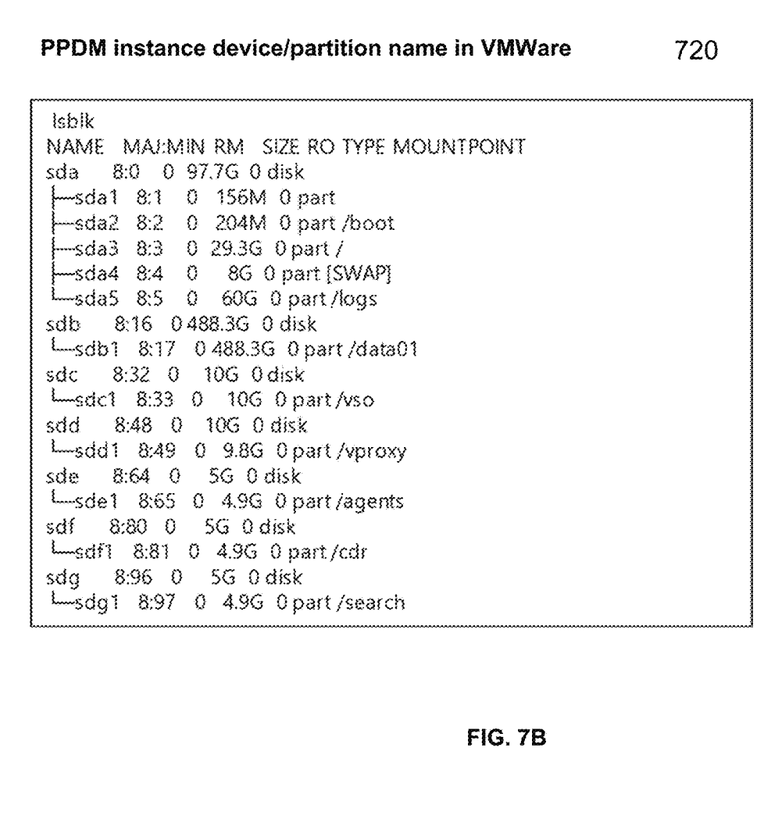
FIG. 7B is an illustration depicting an example of a PPDM instance device or partition name in VMWare according to one embodiment.

FIG. 7 is an example of PPDM instance device or partition name in Azure 700 according to an embodiment. In Azure environment, after a PPDM image is deployed, a partition name does not keep the same order as the VMWare environment although it may be prefixed with "sd". For example, although the partition name sdf1 is /vso in Azure, the partition name is /cdr in VMWare.

Figure 8:
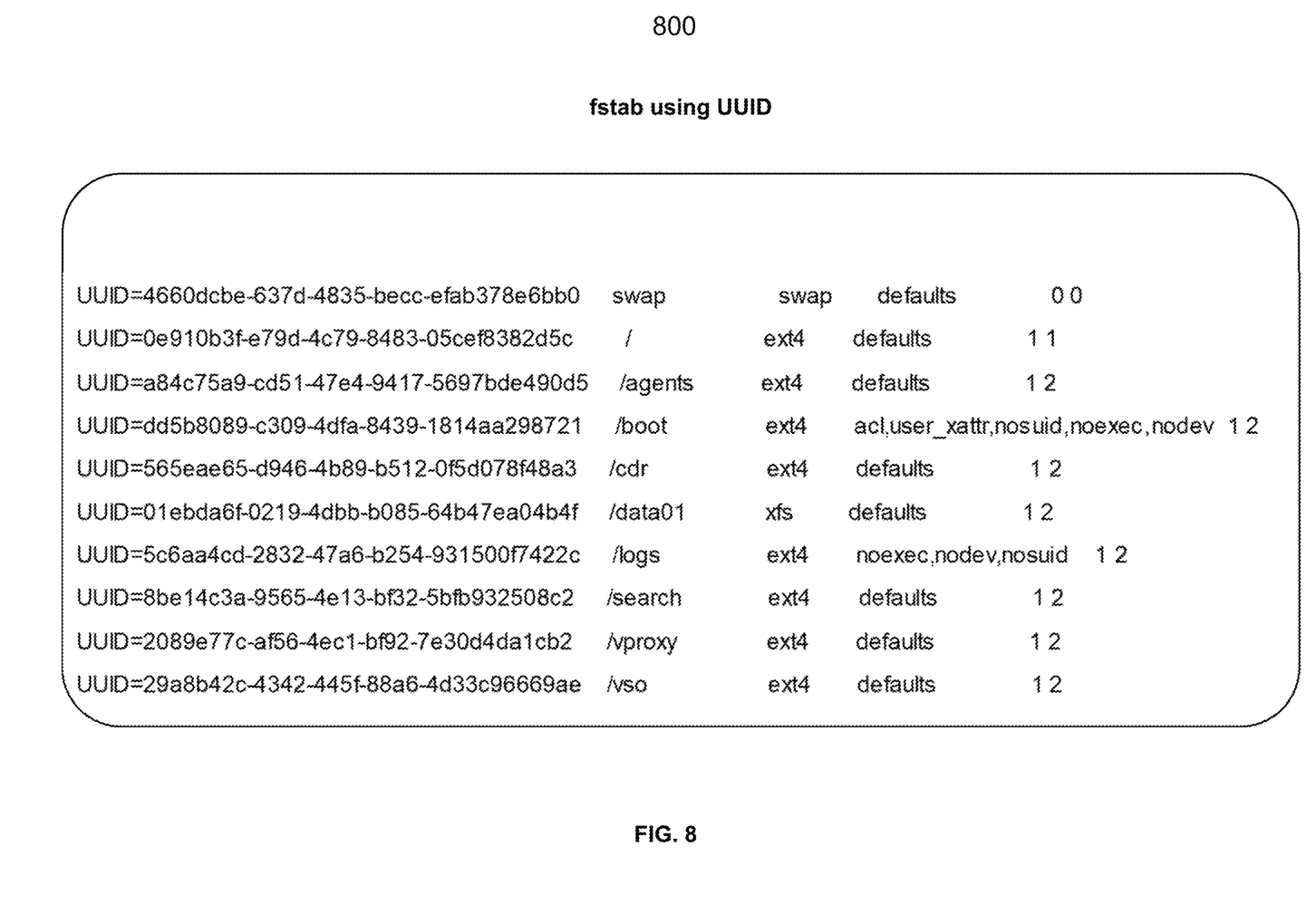
FIG. 8 is an illustration depicting an example of a PPDM FSTAB according to one embodiment.

FIG. 8 is an example of a FSTAB using UUID 800 according to an embodiment. File system UUID can be used to mount device or partition in the FSTAB. UUID is assigned to file systems while formatting the partition. For example, UUID=4660dcbe-637d-4835-becc-efab378e6bb0 is assigned to a first file system in FSTAB 800. UUID may not change and cannot be changed. In public cloud (e.g., AWS), the device or partition may have a different name after deployment. However, the file system UUID does not change and remains after deployment.

Figure 9:
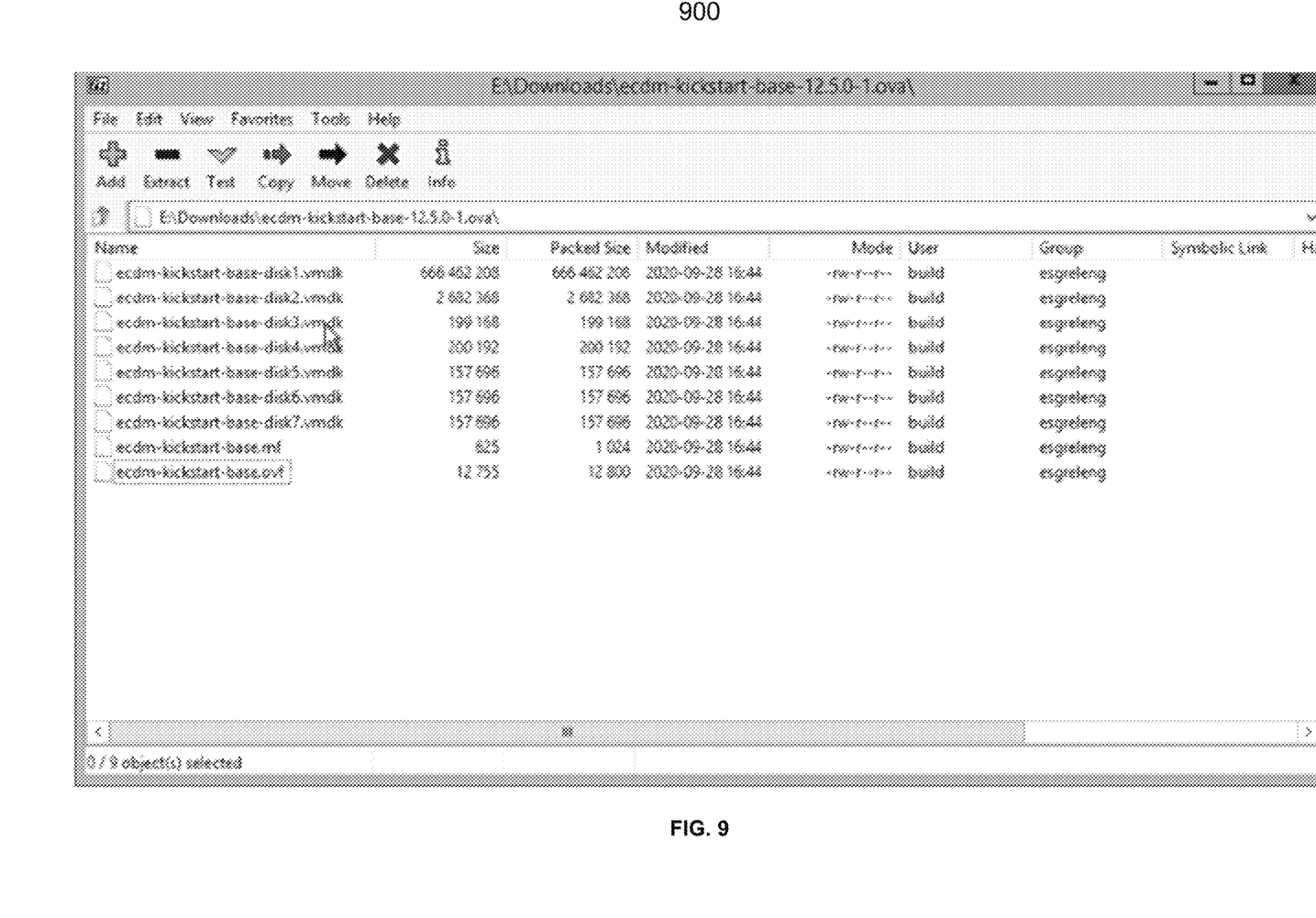
FIG. 9 is an illustration depicting an example of an OVA image file according to one embodiment.

FIG. 9 is an example of a PPDM OVA 900 having one or more dummy disks according to an embodiment. OVA is an OVF Package in a single file archive with the .ova extension. PPDM OVA 900 shows all the files from .ova appliance file. Specifically, there are 7 virtual disk images, a manifest file (.mf), and an OVF file (.ovf). The OVF file includes information of the VM such as the configuration of the VM being deployed. As illustrated, only the root partition with a size of 666 MegaBytes (MB) represents the real VM disk. As further illustrated, each of the one or more dummy VM disks serves as a placeholder for a real VM disk. The dummy disk files in the PPDM OVA 900 may be replaced with the corresponding real VM disk files to generate a second VM installation file.

Figure 10:
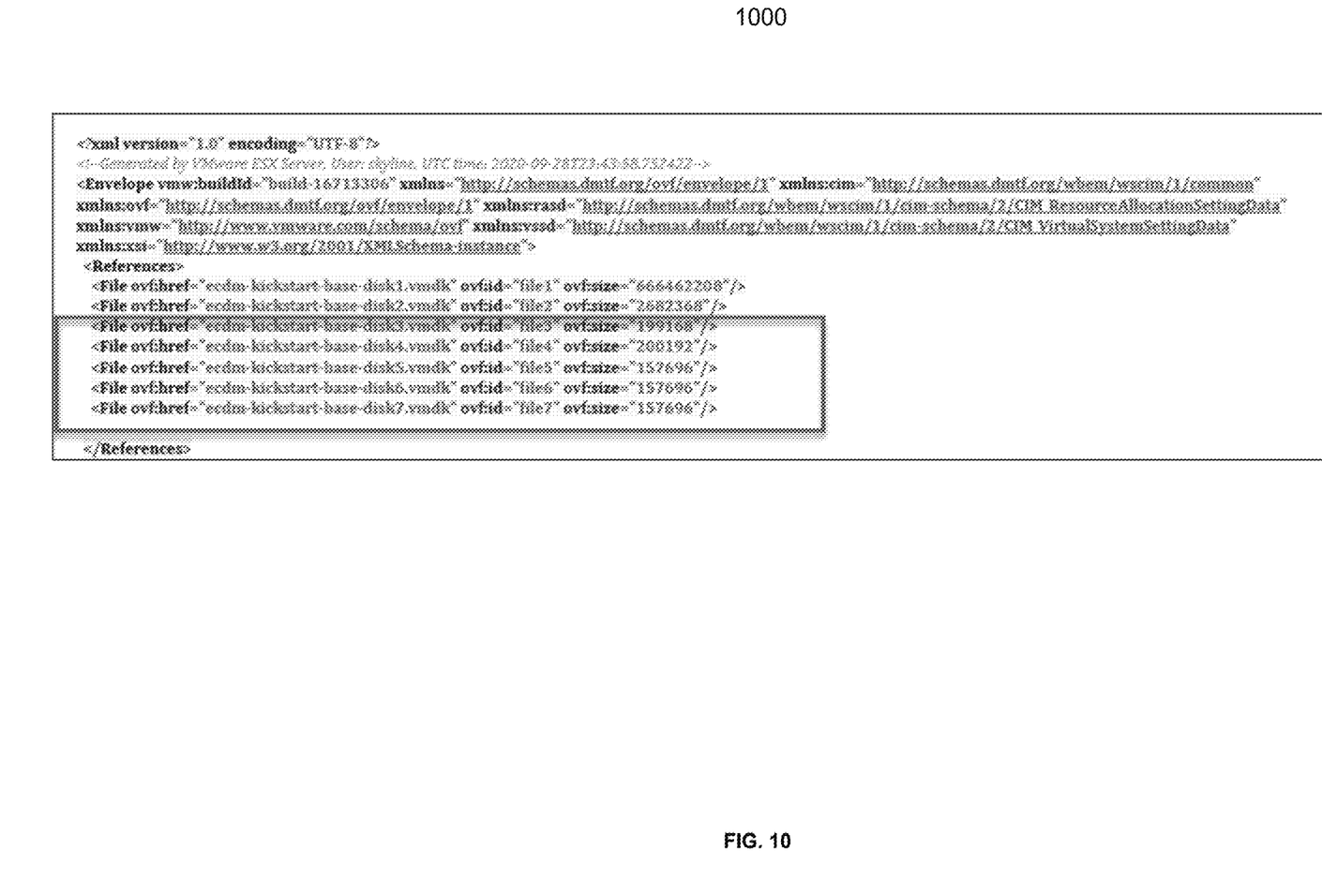
FIG. 10 is an illustration depicting an example of an OVA image file according to one embodiment.

FIG. 10 is an example of metadata 1000 that describes the content and requirements of the packaged virtual appliance in an XML-type format according to an embodiment. To swap out the VMDK files in the OVA image file, the dummy disk files in the first VM installation file are replaced with the corresponding real VM disk files to generate a second VM installation file. The second VM installation is used to deploy VM in different cloud environments. The .ovf file is updated in which a file size of each dummy VM disk file in the FSTAB is modified to match a file size of a corresponding real VM disk file.

Figure 11:
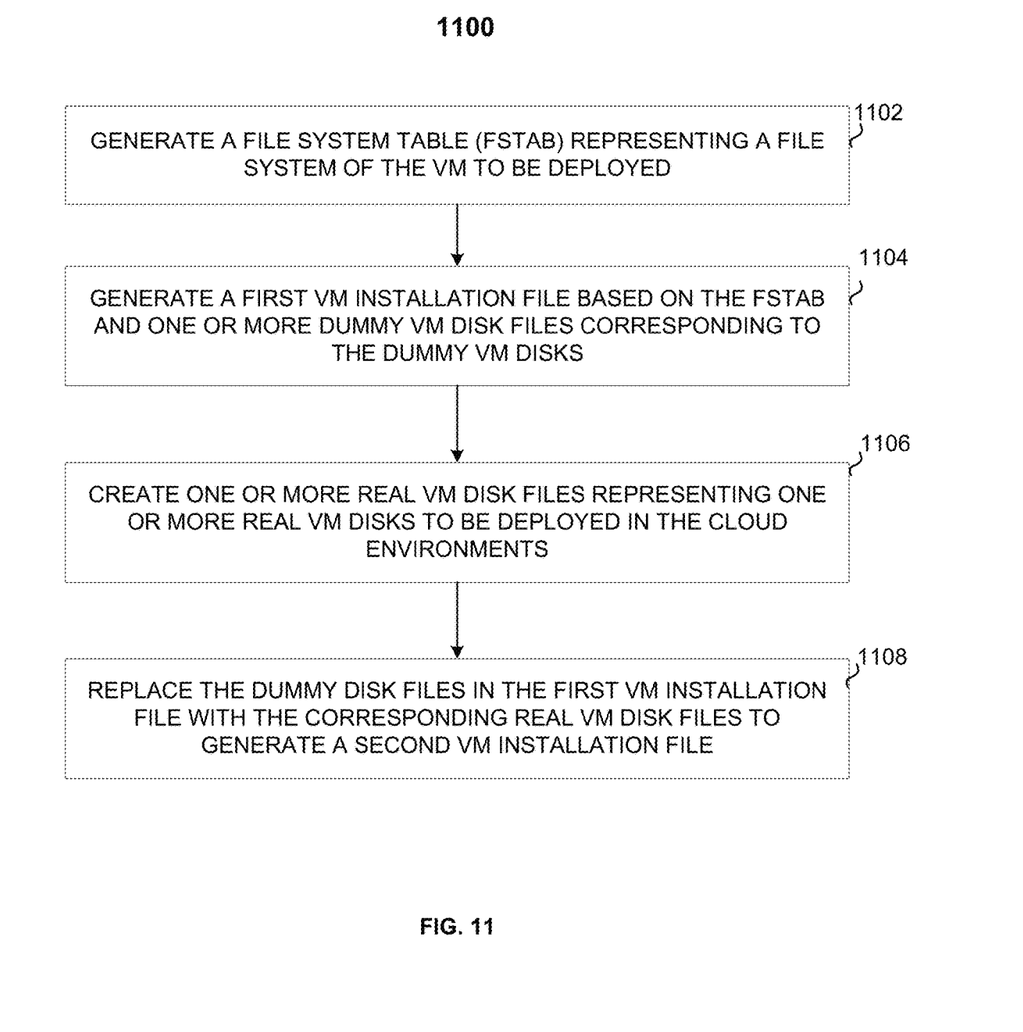
FIG. 11 is a flow diagram illustrating a method for generating a VM installation file to deploy a VM in different cloud environments according to one embodiment.

FIG. 11 is a flow diagram illustrating a process of 1100 according to one embodiment of the invention. Process 1100 may be performed by processing logic that includes hardware (e.g. circuitry, dedicated logic, etc.), software (e.g., embodied on a non-transitory computer readable medium), or a combination thereof. For example, process 1100 may be performed by computing system 200 of FIG. 2. Referring to FIG. 11, at block 1102 a file system table (FSTAB) representing a file system of the VM to be deployed is generated. The FSTAB includes one or more predetermined universally unique identifiers (UUIDs) identifying one or more dummy VM disks. Each of the one or more dummy VM disks serves as a placeholder for a real VM disk. At block 1104, a first VM installation file is generated based on the FSTAB and one or more dummy VM disk files corresponding to the dummy VM disks. At block 1106, one or more real VM disk files representing one or more real VM disks to be deployed in the cloud environments are created. Each of the real VM disk files is identified by the same UUID as of a corresponding dummy disk. At block 1108, the dummy disk files in the first VM installation file is replaced with the corresponding real VM disk files to generate a second VM installation file. The second VM installation is used to deploy VM in different cloud environments.

Therefore, by utilizing embodiments of the disclosure described herein, the FSTAB will continue to work on different cloud types when the OVA is converted to a cloud image.

Note that some or all of the components as shown and described above (e.g., UUID module 206, VM disk creator module 208, FSTAB module 210, archive module 212, and VM installer module 214 of FIG. 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 12:
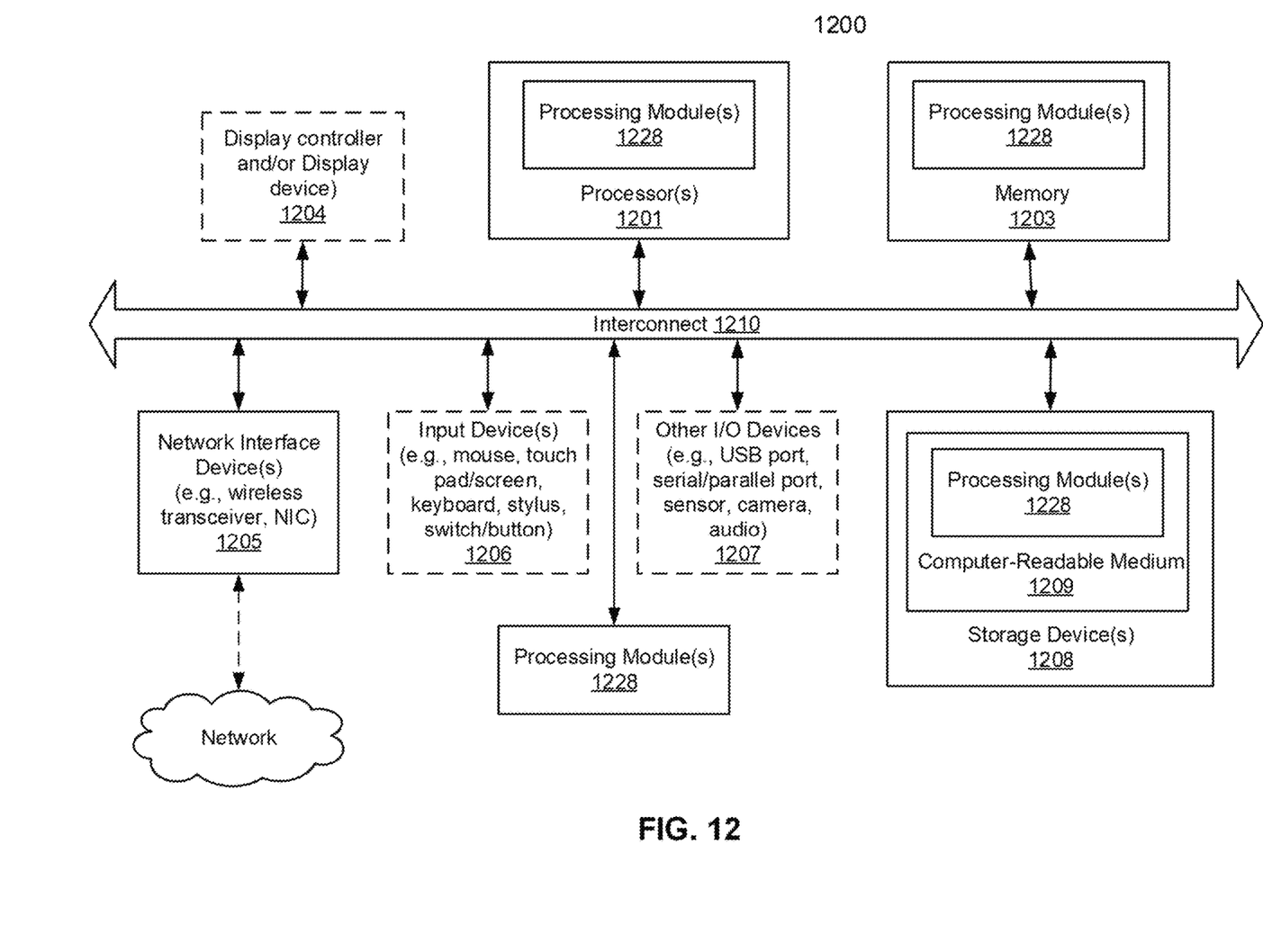
FIG. 12 is a block diagram illustrating a data processing system according to one embodiment.

FIG. 12 is a block diagram illustrating an example of a data processing system which may be used with one embodiment of the invention. For example, system 1200 may represent any of data processing systems performing any of the processes or methods described above. System 1200 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1200 is intended to show a high level view of many components of the computer system. However, it is to be understood that additional components may be present in certain implementations and furthermore, different arrangement of the components shown may occur in other implementations. System 1200 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1200 includes processor 1201, memory 1203, and devices 1205-1208 via a bus or an interconnect 1210. Processor 1201 may represent a single processor or multiple processors with a single processor core or multiple processor cores included therein. Processor 1201 may represent one or more general-purpose processors such as a microprocessor, a central processing unit (CPU), or the like. More particularly, processor 1201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1201 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1201, which may be a low power multi-core processor socket such as an ultra-low voltage processor, may act as a main processing unit and central hub for communication with the various components of the system. Such processor can be implemented as a system on chip (SoC). Processor 1201 is configured to execute instructions for performing the operations and steps discussed herein. System 1200 may further include a graphics interface that communicates with optional graphics subsystem 1204, which may include a display controller, a graphics processor, and/or a display device.

Processor 1201 may communicate with memory 1203, which in one embodiment can be implemented via multiple memory devices to provide for a given amount of system memory. Memory 1203 may include one or more volatile storage (or memory) devices such as random access memory (RAM), dynamic RAM (DRAM), synchronous DRAM (SDRAM), static RAM (SRAM), or other types of storage devices. Memory 1203 may store information including sequences of instructions that are executed by processor 1201, or any other device. For example, executable code and/or data of a variety of operating systems, device drivers, firmware (e.g., input output basic system or BIOS), and/or applications can be loaded in memory 1203 and executed by processor 1201. An operating system can be any kind of operating system, such as, for example, Windows® operating system from Microsoft®, Mac OS®/iOS® from Apple, Android® from Google®, Linux®, Unix®, or other real-time or embedded operating systems such as VxWorks.

System 1200 may further include IO devices such as devices 1205-1208, including network interface device(s) 1205, optional input device(s) 1206, and other optional IO device(s) 1207. Network interface device 1205 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1206 may include a mouse, a touch pad, a touch sensitive screen (which may be integrated with display device 1204), a pointer device such as a stylus, and/or a keyboard (e.g., physical keyboard or a virtual keyboard displayed as part of a touch sensitive screen). For example, input device 1206 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1207 may include an audio device. An audio device may include a speaker and/or a microphone to facilitate voice-enabled functions, such as voice recognition, voice replication, digital recording, and/or telephony functions. Other IO devices 1207 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1207 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1210 via a sensor hub (not shown), while other devices such as a keyboard or thermal sensor may be controlled by an embedded controller (not shown), dependent upon the specific configuration or design of system 1200.

To provide for persistent storage of information such as data, applications, one or more operating systems and so forth, a mass storage (not shown) may also couple to processor 1201. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1201, e.g., via a serial peripheral interface (SPI). This flash device may provide for non-volatile storage of system software, including a basic input/output software (BIOS) as well as other firmware of the system.

Storage device 1208 may include computer-accessible storage medium 1209 (also known as a machine-readable storage medium or a computer-readable medium) on which is stored one or more sets of instructions or software (e.g., processing module, unit, and/or logic 1228) embodying any one or more of the methodologies or functions described herein. Processing module/unit/logic 1228 may represent any of the components described above, such as, for example, UUID module 206, VM disk creator module 208, FSTAB module 210, archive module 212, and VM installer module 214 of FIG. 2 as described above. Processing module/unit/logic 1228 may also reside, completely or at least partially, within memory 1203 and/or within processor 1201 during execution thereof by data processing system 1200, memory 1203 and processor 1201 also constituting machine-accessible storage media. Processing module/unit/logic 1228 may further be transmitted or received over a network via network interface device 1205.

Computer-readable storage medium 1209 may also be used to store some software functionalities described above persistently. While computer-readable storage medium 1209 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1228, components and other features described herein can be implemented as discrete hardware components or integrated in the functionality of hardware components such as ASICS, FPGAs, DSPs or similar devices. In addition, processing module/unit/logic 1228 can be implemented as firmware or functional circuitry within hardware devices. Further, processing module/unit/logic 1228 can be implemented in any combination hardware devices and software components.

Note that while system 1200 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for generating a virtual machine (VM) installation file to deploy a VM in different cloud environments, the method comprising:
   generating a file system table (FSTAB) representing a file system of the VM to be deployed, the FSTAB including one or more predetermined universally unique identifiers (UUIDs) identifying one or more dummy VM disks, wherein each of the one or more dummy VM disks serves as a placeholder for a real VM disk;
   generating a first VM installation file based on the FSTAB and one or more dummy VM disk files corresponding to the dummy VM disks;
   creating one or more real VM disk files representing one or more real VM disks to be deployed in the cloud environments, wherein each of the real VM disk files is identified by the same UUID as of a corresponding dummy disk; and
   replacing the dummy disk files in the first VM installation file with the corresponding real VM disk files to generate a second VM installation file, wherein the second VM installation file is used to deploy VM in different cloud environments.

2. The method of claim 1, wherein the second VM installation file includes an identical file system configuration represented by the FSTAB.

3. The method of claim 1, wherein generating a first VM installation file based on the FSTAB and one or more dummy VM disk files comprises:
   deploying a first VM with a target operating system (OS) and the one or more dummy VM disk files;
   creating a file system using the predetermined UUIDs of the dummy VM disks;
   mounting the one or more dummy VM disks in the file system, generating the FSTAB for the file system; and
   exporting the first VM into the first VM installation file.

4. The method of claim 3, further comprising creating a root partition within the first VM, wherein the root partition includes the FSTAB.

5. The method of claim 1, wherein replacing the dummy disk files in the first VM installation file with the corresponding real VM disk files comprises modifying a file size of each dummy VM disk file in the FSTAB to match a file size of a corresponding real VM disk file.

6. The method of claim 1, wherein the first VM installation file is a compressed file, and wherein the method further comprises decompressing the first installation file to extract the dummy VM disk files and the FSTAB.

7. The method of claim 6, further comprising compressing the first VM installation file after replacing the dummy VM disk files to generate the second VM installation file as a compressed file.

8. The method of claim 1, wherein each of the first and second VM installation files is an open virtual appliance (OVA) compatible image file.

9. A non-transitory machine-readable medium having instructions stored therein, which when executed by a processor, cause the processor to perform operations of generating a virtual machine (VM) installation file to deploy a VM in different cloud environments, the operations comprising:
   generating a file system table (FSTAB) representing a file system of the VM to be deployed, the FSTAB including one or more predetermined universally unique identifiers (UUIDs) identifying one or more dummy VM disks, wherein each of the one or more dummy VM disks serves as a placeholder for a real VM disk;

generating a first VM installation file based on the FSTAB and one or more dummy VM disk files corresponding to the dummy VM disks;

creating one or more real VM disk files representing one or more real VM disks to be deployed in the cloud environments, wherein each of the real VM disk files is identified by the same UUID as of a corresponding dummy disk; and replacing the dummy disk files in the first VM installation file with the corresponding real VM disk files to generate a second VM installation file, wherein the second VM installation file is used to deploy VM in different cloud environments.

10. The machine-readable medium of claim 9, wherein the second VM installation file includes an identical file system configuration represented by the FSTAB.

11. The machine-readable medium of claim 9, wherein generating a first VM installation file based on the FSTAB and one or more dummy VM disk files comprises:

deploying a first VM with a target operating system (OS) and the one or more dummy VM disk files;

creating a file system using the predetermined UUIDs of the dummy VM disks;

mounting the one or more dummy VM disks in the file system, generating the FSTAB for the file system; and exporting the first VM into the first VM installation file.

12. The machine-readable medium of claim 11, wherein the operations further comprise:

creating a root partition within the first VM, wherein the root partition includes the FSTAB.

13. The machine-readable medium of claim 9, wherein replacing the dummy disk files in the first VM installation file with the corresponding real VM disk files comprises modifying a file size of each dummy VM disk file in the FSTAB to match a file size of a corresponding real VM disk file.

14. The machine-readable medium of claim 9, wherein the first VM installation file is a compressed file, and wherein the method further comprises decompressing the first installation file to extract the dummy VM disk files and the FSTAB.

15. A data processing system, comprising:

a processor; and a memory to store instructions, which when executed by the processor, cause the processor to perform operations of generating a virtual machine (VM) installation file to deploy a VM in different cloud environments, the operations including:

generating a file system table (FSTAB) representing a file system of the VM to be deployed, the FSTAB including one or more predetermined universally unique identifiers (UUIDs) identifying one or more dummy VM disks, wherein each of the one or more dummy VM disks serves as a placeholder for a real VM disk;

generating a first VM installation file based on the FSTAB and one or more dummy VM disk files corresponding to the dummy VM disks;

creating one or more real VM disk files representing one or more real VM disks to be deployed in the cloud environments, wherein each of the real VM disk files is identified by the same UUID as of a corresponding dummy disk; and replacing the dummy disk files in the first VM installation file with the corresponding real VM disk files to generate a second VM installation file, wherein the second VM installation file is used to deploy VM in different cloud environments.

16. The data processing system of claim 15, wherein the second VM installation file includes an identical file system configuration represented by the FSTAB.

17. The data processing system of claim 15, wherein generating a first VM installation file based on the FSTAB and one or more dummy VM disk files comprises:

deploying a first VM with a target operating system (OS) and the one or more dummy VM disk files;

creating a file system using the predetermined UUIDs of the dummy VM disks;

mounting the one or more dummy VM disks in the file system, generating the FSTAB for the file system; and exporting the first VM into the first VM installation file.

18. The data processing system of claim 17, wherein the operations further comprise:

creating a root partition within the first VM, wherein the root partition includes the FSTAB.

19. The data processing system of claim 15, wherein replacing the dummy disk files in the first VM installation file with the corresponding real VM disk files comprises modifying a file size of each dummy VM disk file in the FSTAB to match a file size of a corresponding real VM disk file.

20. The data processing system of claim 15, wherein the first VM installation file is a compressed file, and wherein the operations further comprise decompressing the first installation file to extract the dummy VM disk files and the FSTAB.

* * * * *